March 23, 1937.  H. H. KERR, JR  2,074,730
BRAKE
Filed Aug. 31, 1933   5 Sheets-Sheet 1
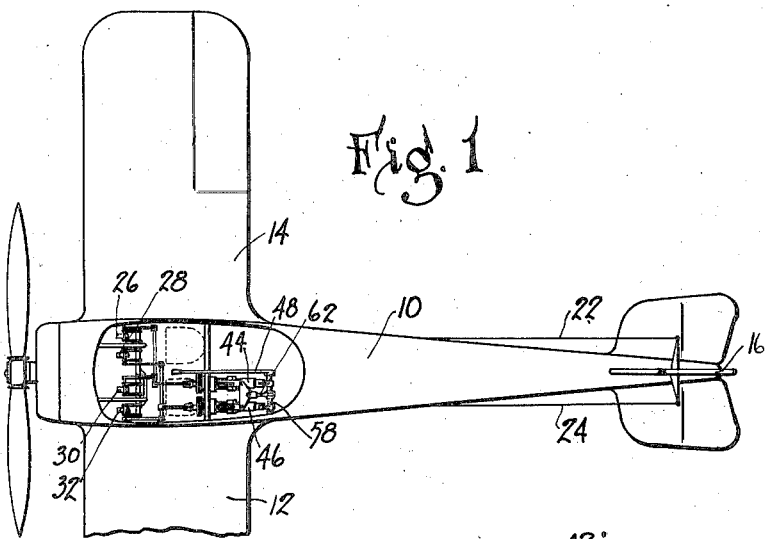
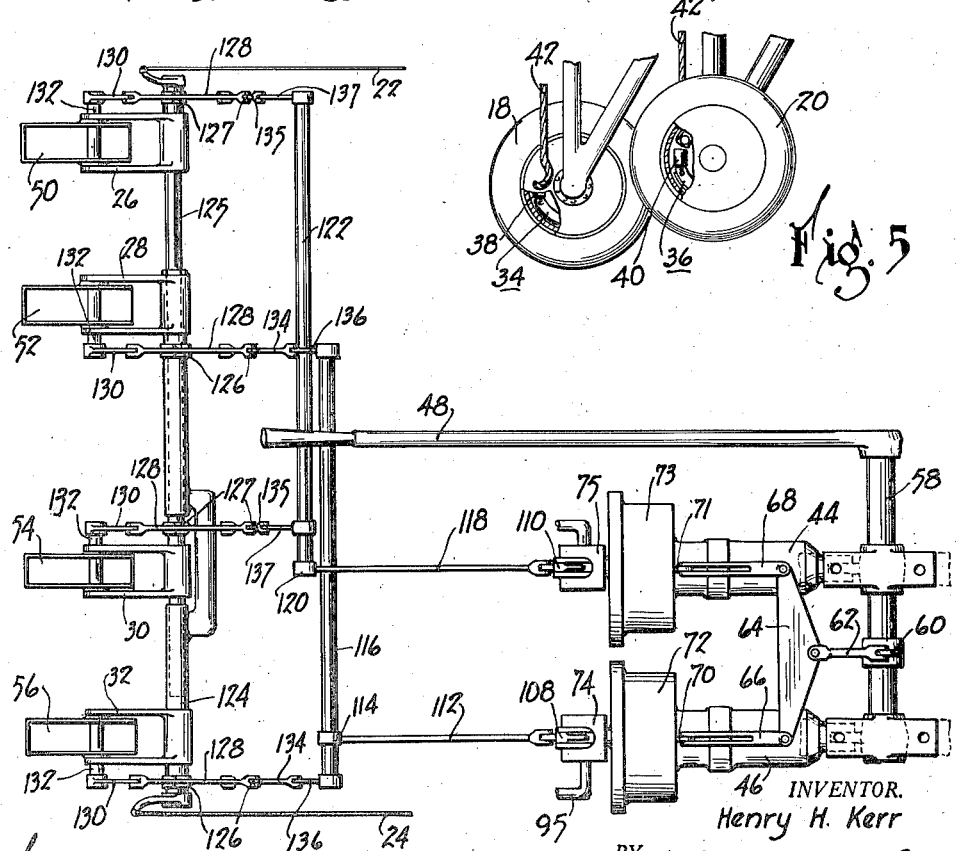
INVENTOR.
Henry H. Kerr
BY Jerome R. Cox
ATTORNEY

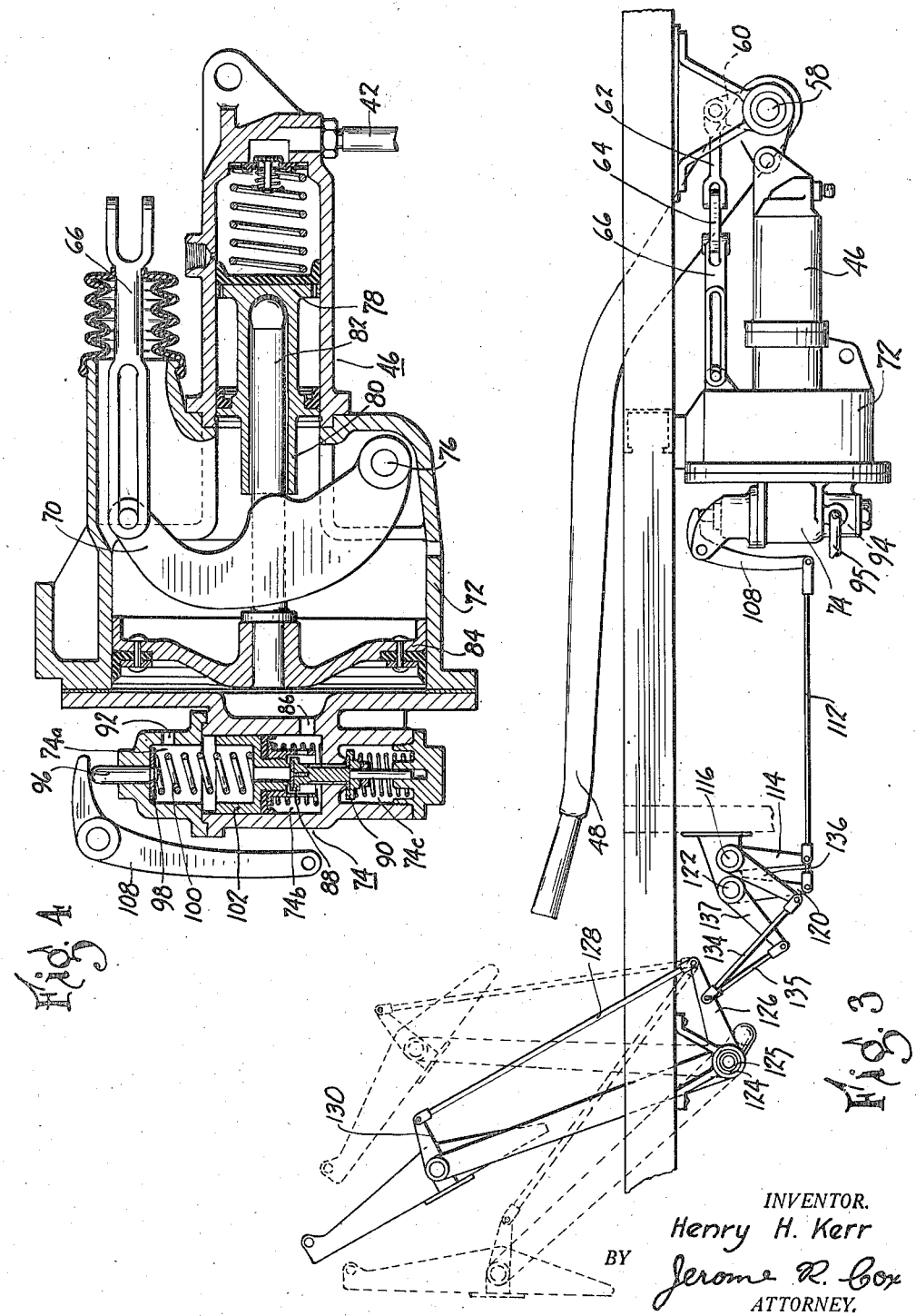

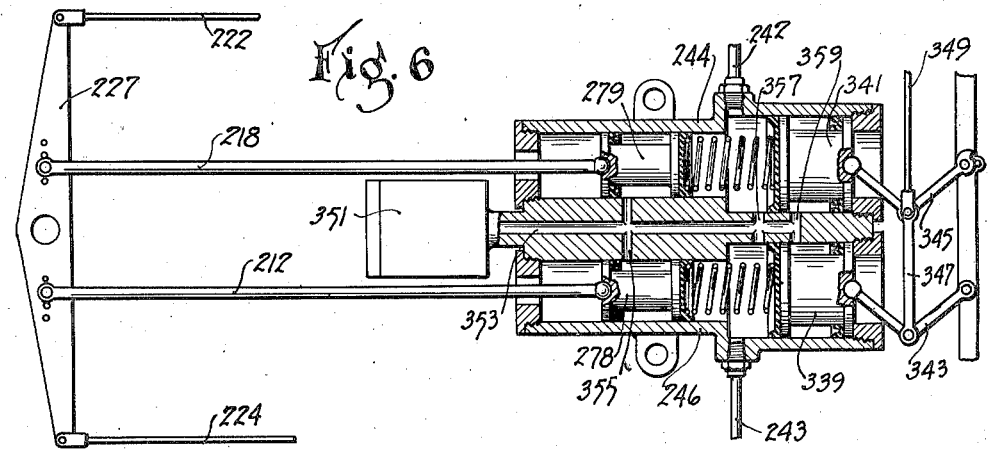
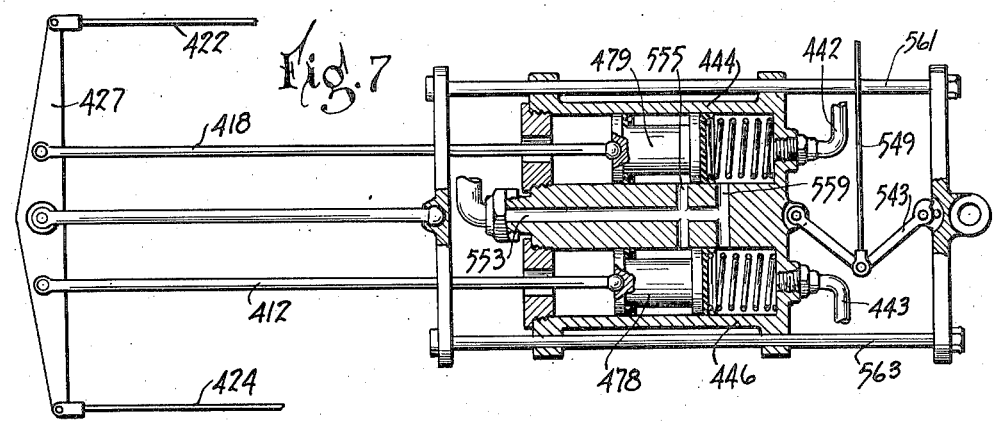
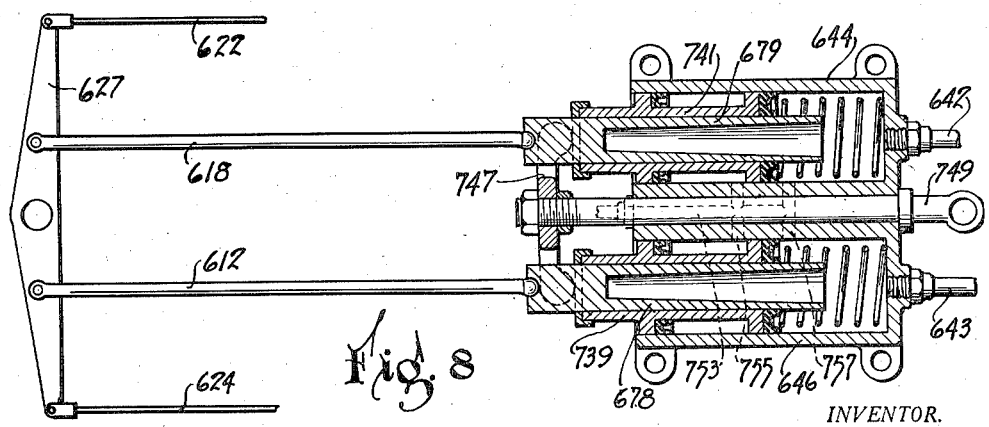

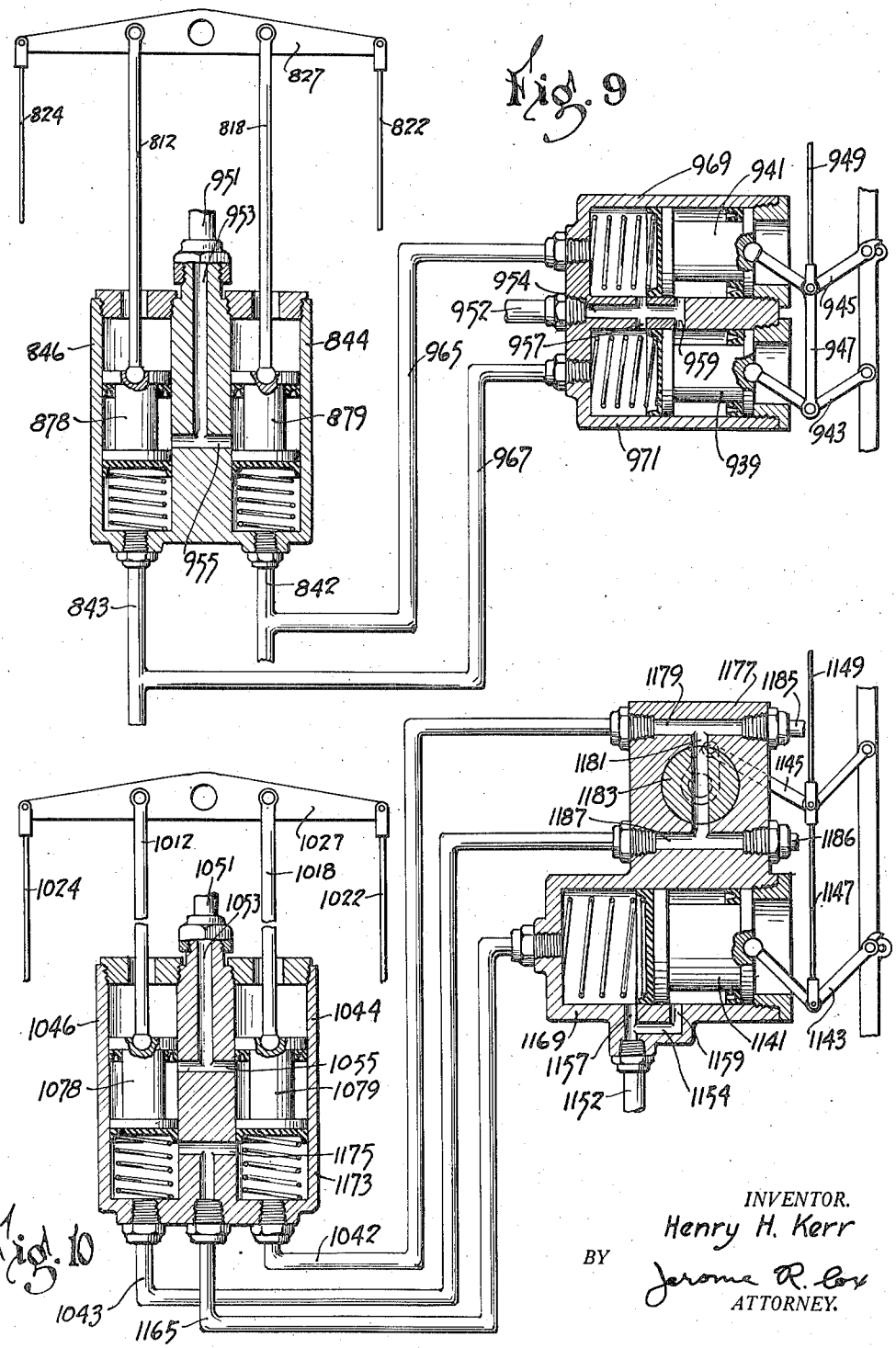

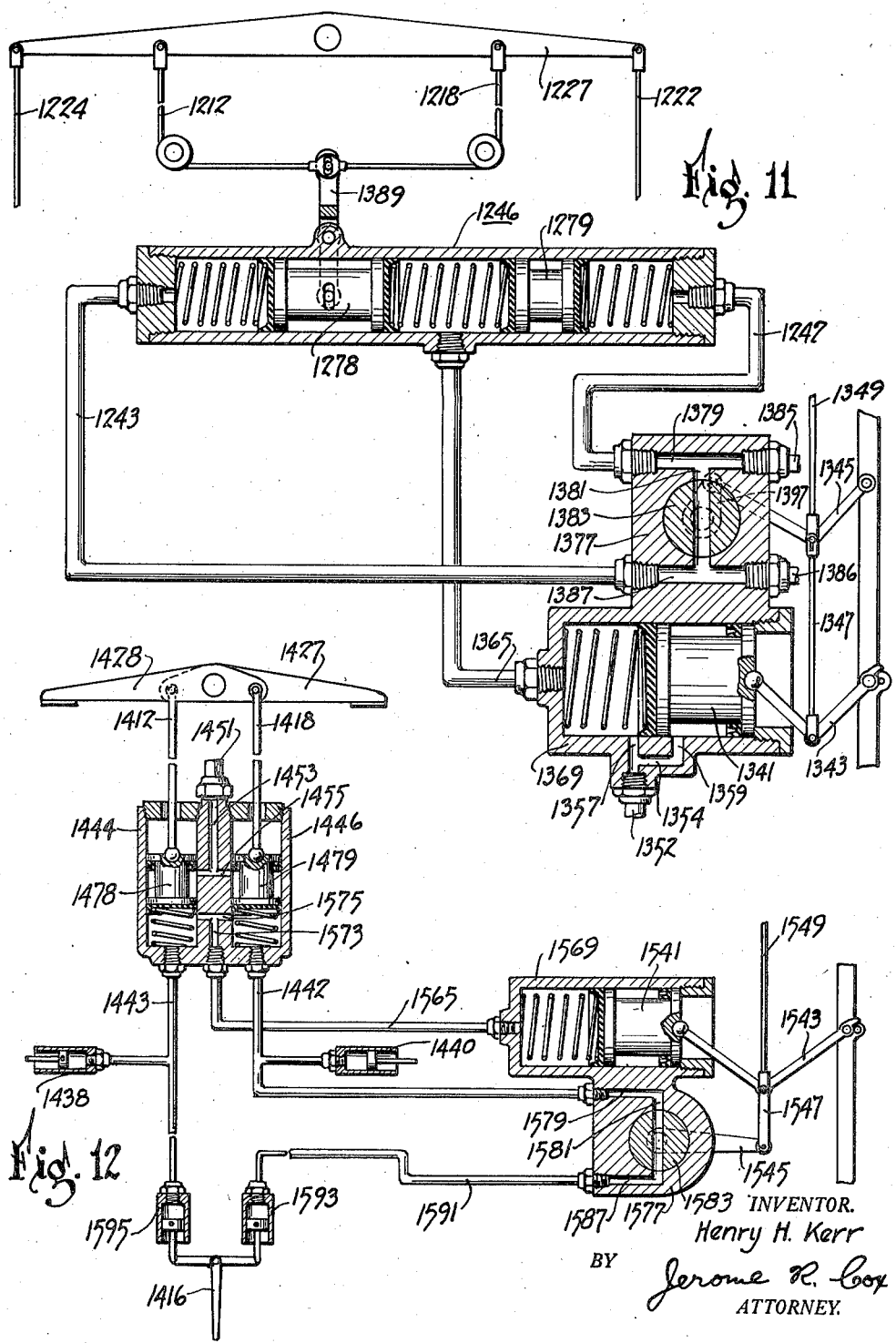

Patented Mar. 23, 1937

2,074,730

UNITED STATES PATENT OFFICE 2,074,730

BRAKE

Henry H. Kerr, Jr., South Bend, Ind., assignor to Bendix Aviation Corporation, South Bend, Ind., a corporation of Delaware Application August 31, 1933, Serial No. 687,571

15 Claims. (Cl. 244—86)

This invention relates to aircraft and more particularly to means for controlling airplanes.

Heretofore, airplanes have been provided with control surfaces including rudders, wheels and wheel brakes, and rudder bars and pedals for controlling the rudders and wheel brakes.

One of the objects of this invention is to provide, in combination with the above elements, a single means for applying all of the wheel brakes substantially equally, when desired, and additional means for transmitting a greater applying force, when desired, to one of the brakes than is transmitted to another of the brakes.

A further object is the provision of compressed air power to operate either of two brakes independently of each other, the applying force being transmitted hydraulically from the cabin to the wheels.

A further object is the provision of means for applying airplane brakes conjunctively with differential control of the brakes through the rudder pedals.

A feature of the illustration of the invention disclosed herein is the inclusion in combination of a hand lever, a hydraulic pressure creating device operated by the hand lever to apply the brakes equally, and means for upsetting this equalization by means of rudder pedals or by a rudder bar.

A further feature of the invention is the provision of a fluid or mechanical by-pass which, when the hand lever is in the brake-off position, permits easy and quick actuation of the rudder.

Further objects and features of the invention should be apparent after reading the subjoined specification and claims and after consideration of the accompanying drawings, in which:

Figure 1 is a fragmentary plan view of an airplane equipped with controls constructed according to my invention;

Figure 2 is an enlarged diagrammatic plan view of a portion of the structure shown in Figure 1;

Figure 3 is a diagrammatic view in side elevation of the structure shown in Figure 2;

Figure 4 is an enlarged view in vertical section of one of the power assemblies, including a master cylinder, a power cylinder and an air control valve;

Figure 5 is a perspective view of a portion of the airplane shown in Figure 1;

Figure 6 is a plan view partly in section of a modified form of brake control;

Figure 7 is a view similar to Figure 6 showing a slightly different construction;

Figure 8 is another view similar to Figure 6 and showing another slightly different form of construction;

Figure 9 is a plan view with parts in horizontal section showing a different embodiment;

Figure 10 is a view similar to Figure 9 showing a still different embodiment;

Figure 11 is a similar view showing another embodiment; and

Figure 12 is a similar view showing still another embodiment of my invention.

In Figures 1 to 5 inclusive I have shown an airplane provided with a fuselage 10, supporting airfoils 12 and 14, a rudder 16 and wheels 18 and 20. The rudder 16 is controlled by cables 22 and 24, which are adapted to be operated by foot pedals 26, 28, 30 and 32. The wheels 18 and 20 are equipped with brakes 34 and 36, which are operated by hydraulic motors 38 and 40. Liquid under pressure is supplied to the motors 38 and 40 through conduits such as 42 by means of master cylinders 44 and 46. The master cylinders 44 and 46 are adapted to be operated either by a hand lever 48 or by auxiliary pedals 50, 52, 54, and 56, which are rotatively mounted on pedals 26, 28, 30, and 32 respectively.

The hand lever 48 operates the master cylinders 44 and 46 so as to supply liquid under substantially equal pressure to both of the brake cylinders 38 and 40. The lever 48 is secured to a torque shaft 58 and movement thereof rotates the shaft. The shaft carries an upstanding lever 60, which is connected through a link 62 with an equalizing bar 64. The equalizing bar is connected through links 66 and 68 with levers 70 and 71 respectively.

The levers 70 and 71 (see Figure 4) and the interior of master cylinders 44 and 46 are substantially alike and one description will suffice for both. It may be noted that the lever 70 is a curved lever positioned chiefly within the casting forming the power cylinder 72, the lever being pivoted in the lower part of the casting at 76. The lever 71 is similarly postioned in a power cylinder 73. Within the master cylinder 46 there is provided a master cylinder piston 78 having formed therewith a rearwardly extending sleeve 80 against which an annular projection on the lever 70 bears.

Power means are provided to operate each master cylinder piston individually. Extending into the sleeve and rearwardly through the lever 70 is a piston rod 82. The rear end of the piston rod 82 is secured to an air piston 84, which is thus also adapted to actuate the piston 78 as well as the lever 70. The rear end of the power cylinder 72 is connected to the valve 74 by means of an inlet port 86, and similarly the rear end of the power cylinder 73 is connected to a valve 75, which is in all respects like the valve 74.

The valve 74 controls the inlet of compressed air to the power cylinder. It is provided with three chambers designated 74a, 74b, and 74c respectively, 74b being connected to the power cylinder by the port 86. Chambers 74a and 74b are adapted at times to be connected and at other times to be closed from each other by means of the valve piston 88. Chambers 74b and 74c are adapted at times to be connected and at other times to be separated by a flap valve 90. The chamber 74a is connected to the atmosphere through a port 92 and the chamber 74c is connected to a source of air under pressure through a port 94 and a conduit 95. A plunger 96, extending through the upper part of the valve 74, has a head 98 which bears upon a relatively strong spring 100 and through the spring is adapted to exert force upon a plunger 102. When the plunger 102 is moved downward it contacts with the valve piston 88 and through said valve piston 88 is adapted to move the flap valve 90 from its seat.

The valves 74 and 75 are controlled by the auxiliary pedals 50, 52, 54, and 56. The plunger 96 and the corresponding plunger for valve 75 are operated through levers 108 and 110 respectively. Lever 108 is connected through a link 112 with a lever 114 secured to the shaft 116. Similarly, the lever 110 has secured thereto a link 118 connected to a lever 120 secured to the shaft 122.

The mechanism by which the shafts 116 and 122 are rotated by their associated auxiliary pedals 50, 52, 54, and 56 includes a series of levers and connected links. The pedals 28 and 32 are secured to a tubular shaft 124 and the pedals 26 and 30 are secured to an inner concentric shaft 125. Movement of the pedals rotates the respective shafts, and inasmuch as the cables 22 and 24 are connected to levers on the ends of the respective shafts movement of the pedals thus actuates the rudder 16 through the cables 22 and 24. Mounted for rotation on the shaft 124 are a pair of levers 126 and similarly mounted on the shaft 125 are a pair of levers 127. The ends of these levers 126 and 127 are connected through links 128 with levers 130 secured on shafts 132 to which there is also secured the associated auxiliary pedal. Thus rotation of the auxiliary pedals also turns the levers 126 and 127. Also connected to the levers 126 and 127 are links such as 134 and 135 which have their opposite ends connected to levers such as 136 and 137 secured to the shafts 116 and 122. Thus it is clear that rotation of the main pedals with the shafts 124 and 125 without relative displacement of the auxiliary pedals has no effect upon the valves 74 or 75, and therefore has no effect upon the brakes. Furthermore, relative displacement of the auxiliary pedals will apply the brakes regardless of the position of the main pedals.

In the operation of the control system above described, the pilot may be seated either in the right-hand side or the left-hand side of the cockpit. The operation is the same from either side. Assuming that he is seated in the right-hand side of the cockpit, movement of the pedals 26 and 28 as a whole without relative displacement of the auxiliary pedals will rotate the rudder 16 through the cables 22 and 24. If the pilot desires to apply both brakes simultaneously, he may use either the hand lever 48 or the pedals 50 and 52, or he may take up slack with the hand lever and graduate the application by the pedals 50 and 52. Assuming that he desires to use the pedals only, he moves the auxiliary pedals 50 and 52 relative to the main pedals 26 and 28 and thus rotates the shafts 132 and through the levers 130, the links 128, the levers 126 and 127, the links 134 and 135, and the levers 136 and 137 rotates the shafts 116 and 122. This rotation acts through the levers 114 and 120, the links 118 and 112 and the levers 108 and 110 to operate the plungers in the valves 74 and 75 to move the pistons 102 downward and to move the lower ends thereof into contact with the valve pistons or members 88. This closes off the chamber 74b from the atmospheric pressure in 74a. Further movement of the plunger unseats the valve 90 so that air under pressure flows from the chamber 74c to the chamber 74b. Air under pressure passing through the port 86 forces the piston 84 to the right as seen in Figure 4 and thus moves the piston 78 to compress the liquid in the master cylinder 46 and to force it out under pressure. At the same time the piston in the master cylinder 44 similarly acts on the liquid therein. So liquid is forced out through both of the conduits 42 to the brake cylinders 38 and 40, thus applying the brakes 34 and 36.

Should the pilot desire to apply the brakes unequally he may use the pedals alone or first take up the slack with the hand lever and then graduate and differentiate the application by means of the pedals. Whether or not he uses the hand lever, he may actuate either one of the brakes separately to any desired extent by pressing upon the corresponding pedal.

Should he desire to apply both brakes equally and to maintain them applied, as for example when it is desired to anchor the airplane at one place on the field, he may operate the brakes by the lever 48 alone. In operation of the brakes by the hand lever, whether merely for the purpose of taking up slack or as a sole operating and anchoring means, the pilot pulls the lever 48. This action through the shaft 58, the lever 60, the link 62, the equalizing bar 64 and the links 66 and 68 operates the levers 70 and 71 to force the pistons 78 to the right through the sleeves 80. It is to be noted that the piston 78 may move to the right (in Figure 4) away from the piston rod 82 without moving the air piston 84. Moreover, operation of the pistons 78 by means of the air pistons 84 does not affect the hand lever 48 and its associated linkage on account of the slot and pin connections at the inner end of links 66 and 68.

In the structure shown in Figure 6 the rudder bar 227 is connected through cables 222 and 224 with the rudder. It is connected through links 212 and 218 with pistons 278 and 279 positioned in the cylinders 246 and 244 respectively. The forward ends of the cylinders 244 and 246 are enlarged and provided with relatively large pistons 339 and 341. The pistons 339 and 341 are adapted to be operated by toggles 343 and 345 connected by a link 347 and both connected through said link to a cable 349 which leads to a hand operated lever (not shown). The cylinder 244 is adapted to supply liquid under pressure to one brake through a conduit 242, and the cylinder 246 is adapted to supply liquid under pressure to another brake through a conduit 243. A reservoir 351 providing a reserve supply of liquid is connected with the cylinders 244 and 246 by means of bores 353, 355, 357, and 359.

In the operation of this system rotation of the rudder bar 227 is adapted to operate the rudder by means of cables 222 and 224. Inasmuch as the links 212 and 218 are connected on opposite sides of the fulcrum of the rudder bar, the piston 278 is advanced or retracted an amount equal to the retraction or advancement of piston 279. Provided the pistons 339 and 341 have not been moved from their normal positions shown, the liquid may flow freely through the bore 357 from one cylinder to the other so that there is no unnecessary effort in moving the rudder due to the operation of the brakes. However, if it is desired to apply the brakes, a pull upon the cable 349 through the hand lever moves the pistons 339 and 341 to develop equal pressure in both of the brake motors and apply both of the brakes. At the same time the movement of the pistons 339 and 341 cuts off communication through the bore 357. Thereafter rotation of the rudder bar 227 upsets the equalization between the two cylinders and enables the operator to apply one brake with greater force than the other as desired. Inasmuch as this upsetting operation is accomplished by the rudder bar, it is natural for the pilot to steer by means of the brakes.

In Figure 7 the rudder bar 427 is connected through the cables 422 and 424 with the rudder and through the links 412 and 418 with the pistons 478 and 479 in the cylinders 444 and 446. The cylinders 444 and 446 are formed integrally and are mounted to slide upon a frame which includes rods 561 and 563. A toggle 543 is connected at one end to a portion of the frame and at the opposite end to the casting which forms the cylinders 444 and 446. The knee of the toggle is connected to a cable 549 which leads to the hand lever (not shown). The transverse bores 555 and 559 are connected by a longitudinal bore 553 to a reserve supply of fluid (not shown). The cylinders 444 and 446 are connected by conduits 442 and 443 with the brakes.

The operation of this form of my device is substantially the same as that shown in Figure 6. However, in applying the brakes equally the whole unit including the cylinders 444 and 446 moves while the pistons 478 and 479 remain stationary, thus eliminating the necessity for auxiliary pistons such as 339 and 341.

In the device shown in Figure 8, a rudder bar 627 is connected through tension elements 622 and 624 with a rudder and through the compression elements 612 and 618 with pistons 678 and 679. The piston 678 is positioned in a cylinder 646 which is connected through a conduit 643 with one of the brakes, while the piston 679 is positioned in a cylinder 644 which is connected through a conduit 642 with the other brake. Surrounding the piston 679 in the cylinder 644 is an annular piston 741, and surrounding the piston 678 in the cylinder 646 is an annular piston 639. A yoke 747 having bifurcated ends is adapted to bear upon the outer ends of the annular pistons 739 and 741 and is secured to one end of a rod 749. The opposite end of the rod 749 is connected in any suitable manner with a hand lever (not shown).

The operation of this form of my invention is substantially the same as that shown in Figures 6 and 7. However, the equal application of the brakes and the closing of the by-pass between the two cylinders, as well as the initial operation of the brakes, is accomplished by the annular pistons 739 and 741.

In the embodiment shown in Figure 9, the rudder bar 827 is connected to the rudder through tension members 822 and 824 and to pistons 878 and 879 through compression elements 812 and 818. The pistons 878 and 879 are contained in cylinders 844 and 846 which have conduits 842 and 843 leading to the brake motors. The cylinders 844 and 846 are normally connected to each other through auxiliary cylinders 969 and 971, conduit 842 being connected to auxiliary cylinder 969 by a conduit 965, and conduit 843 being connected to auxiliary cylinder 971 by a conduit 967. The cylinders 969 and 971 are connected to each other by means of a transverse bore 957 which leads into a main bore 954, the latter being connected through a conduit 952 with a reservoir for the supply of additional fluid. Positioned in the cylinders 969 and 971 are pistons 941 and 939 which are adapted at times to close the transverse bore 957 and thus cut off communication between the cylinders 969 and 971 and thus between the cylinders 944 and 946. Moreover, actuation of the pistons 939 and 941 is adapted to supply initial braking pressure for operating the brakes, the pressure developed thereby being substantially equalized. The pistons 939 and 941 are adapted to be operated by toggles 943 and 945 which are connected by a link 947 which is also connected to a tension element 949, the latter leading to a hand lever (not shown).

The operation of the above described embodiment will be apparent from the description when considered in connection with the operation of the previous embodiments, the structure being substantially the same as that shown in Figure 6, except that separate cylinders are provided instead of combining the main cylinder and the auxiliary cylinder in one unit.

In Figure 10 the rudder bar 1027 is connected through the cables 1022 and 1024 with the rudder and through the compression rods 1012 and 1018 with the pistons 1078 and 1079. The conduits 1042 and 1043 pass through a valve block 1177. The valve block 1177 is provided with bores 1179 and 1187 and with a by-pass 1181 having a portion thereof formed in a plug valve 1183. The plug valve 1183 is adapted to be rotated to close the by-pass by means of the toggle 1145 connected to a cable 1149 leading to a hand lever (not shown). Both cylinders 1044 and 1046 are connected through bores 1175 and 1173 to a conduit 1165 which leads to an auxiliary cylinder 1169. Positioned in the auxiliary cylinder is a piston 1141 which is adapted to be operated by a toggle 1143 connected through a link 1147 with the toggle 1145. Conduits 1185 and 1186 connect the bores 1179 and 1187 with the brakes. Additional liquid is supplied, when needed, to the cylinders 1044 and 1046 through a conduit 1051 and bores 1053 and 1055, and to cylinder 1169 through conduit 1152 and bores 1157, 1154 and 1159.

In the operation of this embodiment of my invention, movement of the hand lever closes the by-pass 1181 and forces fluid under pressure from the cylinder 1169. This accomplishes the initial equal application of the brakes. Subsequent upsetting of the braking may be accomplished by rotation of the rudder bar, thus operating the pistons 1078 and 1079 to force fluid selectively from one of the cylinders 1044 and 1046.

In the embodiment shown in Figure 11, the rudder bar 1227 is connected to the rudder through cables 1222 and 1224 and to a lever 1389 through cable 1212 and 1218. The lever 1389 is pivoted on a master cylinder 1246 and has its opposite end connected to a piston 1278 positioned in said cylinder. Also in said cylinder is a floating piston 1279 and extending from opposite ends thereof are conduits 1242 and 1243. Connected to the cylinder 1246 intermediate its ends and intermediate the pistons 1278 and 1279 is a third conduit 1365. The conduits 1242 and 1243 lead respectively to bores 1379 and 1387 in a valve block 1377. The opposite ends of the bores 1379 and 1387 are connected to conduits 1385 and 1386 leading to the associated brakes, and a transverse bore 1381 connects the bores 1379 and 1387. A plug valve 1383 is adapted to open or close the by-pass formed by the bore 1381, the plug valve being adapted to be operated by a lever 1397 connected by a lost motion connection with a toggle 1345. The knee of the toggle is connected to a tension member 1349 which leads to the hand lever and is also connected by a link 1347 with another toggle 1343. The conduit 1365 leads to a cylinder 1369 which is provided with a piston 1341 connected to the toggle 1343. Additional liquid is supplied when needed by a conduit 1352 and bores 1357, 1354 and 1359.

By operating the hand lever the piston 1341 is operated to take up the slack at the brakes and, if desired, apply the brakes equally. In this action the floating piston 1279 is moved to the right (as seen in Figure 11), the liquid flowing freely through the by-pass 1381. Towards the end of the movement of the hand lever the by-pass 1381 is closed and the brakes on each side may thereafter be separately varied by movement of the piston 1278 by means of the rudder 1227.

It is to be noted that in the structures shown in Figures 6, 8, 9, 10, and 11, movement of the rudder bars is normally not hindered by the hydraulic system due to the by-passes 357, 757, 957, 1181, and 1381.

In Figure 12 the rudder bar is formed in two sections 1427 and 1428 resiliently held together so that normally they act as a unit. The section 1427 is connected through the link 1412 with the piston 1478 in cylinder 1444 and the section 1428 is connected by link 1418 with piston 1479 in cylinder 1446. The cylinder 1444 is connected by conduit 1443 with brake wheel motor 1438 and with rudder motor 1595, which together with rudder motor 1593 controls rudder 1416. The cylinder 1446 is connected by conduit 1442 with brake wheel motor 1440 and with valve block 1577. The valve block is formed with communicating bores 1579, 1581, and 1587. The former is connected to the conduit 1442 and the latter with a conduit 1591 which is connected at its other end with the rudder motor 1593. The cylinders 1444 and 1446 are formed with intercommunicating bores 1575 and 1573, the latter of which is connected by a conduit 1565 with an auxiliary pressure cylinder 1569. The cylinder 1569 is provided with a piston 1541 which is operated through a toggle 1543 by a tension element 1549 connected to a hand lever (not shown). A link 1547 connected to the knee of the toggle is fastened at its opposite end to a lever 1545 controlling the valve plug 1583. The cylinders 1444 and 1446 are supplied with additional liquid when required by a conduit 1451 through bores 1453 and 1455.

When the pilot desires to actuate the rudder without actuation of the wheel brakes, the hand lever is left in its normal position, thus maintaining the valve 1583 open as shown and the piston 1541 in the position shown. Rotation of the rudder bar formed by the sections 1427 and 1428 operates the rudder motors 1593 and 1595 but does not affect the motors 1438 and 1440.

If it is desired to apply the brakes equally, this may be accomplished either by use of the hand lever alone, thus applying pressure to both sides of the system through the conduit 1565 by means of the piston 1541, or by means of pressure on both sections 1427 and 1428, thus moving both pistons 1478 and 1479 forward in their cylinders. If it is desired to apply the brakes unequally, the hand lever is first operated to close the valve 1583. Thereafter, operation of the rudder bar 1427-1428 is effective to apply greater pressure to one of the motors 1438 and 1440 than to the other.

It is to be understood that the above described embodiments of my invention are for the purpose of illustration only and various changes may be made therein without departing from the spirit and scope of the invention.

I claim:

1. In an airplane control system for an airplane equipped with a right wheel and a left wheel and with a rudder, in combination a hydraulic motor for each brake, a pair of hydraulic motors for the rudder, each of which is arranged to move the rudder in a direction opposite to the other, a pair of master cylinders one connected to one of said brake motors and to one of said rudder motors and the other connected to the other brake motor and the other rudder motor, and means for varying pressures in said master cylinders simultaneously either by increasing the pressure in both or by increasing the pressure in one and decreasing the pressure in the other, said means comprising a two piece rudder bar and a pair of pistons one positioned in one cylinder and connected to one piece of the rudder bar and the other positioned in the other cylinder and connected to the other piece of the rudder bar.

2. In an airplane control system for an airplane equipped with a right wheel and a left wheel and with a rudder, in combination a hydraulic motor for each brake, a pair of hydraulic motors for the rudder, each of which is arranged to move the rudder in a direction opposite to the other, a pair of master cylinders one connected to one of said brake motors and to one of said rudder motors and the other connected to the other brake motor and the other rudder motor, a master cylinder piston in each master cylinder, and means for actuating said master cylinder pistons simultaneously either in opposite directions or in the same direction, said means comprising a pair of levers connected respectively to said pistons and arranged normally to move in the same rotative direction but capable of moving in opposite directions.

3. In an airplane control system for an airplane equipped with a right wheel and a left wheel and with a rudder, in combination a hydraulic motor for each brake, a pair of hydraulic motors for the rudder, each of which is arranged to move the rudder in a direction opposite to the other, a pair of master cylinders one connected to one of said brake motors and to one of said rudder motors and the other connected to the other brake motor and the other rudder motor, a master cylinder piston in each of said master cylinders, means for actuating said master cylinder pistons simultaneously either in opposite directions or in the same direction, and a valve for closing the connection from one of said cylinders to its associated rudder motor.

4. In an airplane control system for an airplane equipped with a right wheel and a left wheel and with a rudder, in combination a hydraulic motor for each brake, a pair of hydraulic motors for the rudder, each of which is arranged to move the rudder in a direction opposite to the other, a pair of master cylinders one connected to one of said brake motors and to one of said rudder motors and the other connected to the other brake motor and the other rudder motor, pistons in said master cylinders, means for actuating said master cylinder pistons simultaneously either in opposite directions or in the same direction, an auxiliary cylinder, a piston therein, a hand lever for controlling said auxiliary piston, a connection from said auxiliary cylinder to both of said first mentioned cylinders, a valve for closing the connection between one of said first mentioned cylinders and its associated rudder motor, and common means connecting said hand lever to said auxiliary piston and said valve.

5. In an airplane control system for an airplane equipped with a right wheel and a left wheel and with a rudder, in combination a hydraulic motor for each brake, a spring for each brake motor which normally prevents it from being actuated, a pair of hydraulic motors for the rudder, each of which is arranged to move the rudder in a direction opposite to the other, a pair of master cylinders one connected to one of said brake motors and to one of said rudder motors and the other connected to the other brake motor and the other rudder motor, a piston in each of said master cylinders, and means for actuating said master cylinder pistons simultaneously either in opposite directions or in the same direction.

6. In a hydraulic pressure creating device for airplane brakes for an airplane, in combination means for developing hydraulic pressure comprising a pair of master cylinders, and a pair of pistons in said cylinders, a by-pass connecting said cylinders, connections for operating said pistons in opposite directions, separate means for developing substantially equal increased pressures in said cylinders, and means actuated by the operation of one or more of said pressure developing means for controlling said by-pass.

7. In a hydraulic pressure creating device for airplane brakes for an airplane, in combination a pair of master cylinders, a pair of pistons in said cylinders, connections for operating said pistons in opposite directions, means for developing increased pressures in said cylinders, means for equalizing the pressure in said cylinders including a passage, a valve for closing said passage, and means actuated by the operation of said increased pressure developing means for opening and closing said valve.

8. In a hydraulic pressure creating device for airplane brakes for an airplane, in combination a pair of master cylinders, a pair of pistons in said cylinders, connections for operating said pistons in opposite directions, and separate means for developing increased pressures in said cylinders, means for equalizing pressures in said cylinders, including a fluid passage, a valve for closing said fluid passage, and a common control for said pressure developing means and said valve.

9. In an airplane control system for an airplane equipped with a right wheel and a left wheel with a brake for each wheel, and with a control surface, in combination a hydraulic motor for each brake, a pair of hydraulic motors for said control surface, each of which is arranged to move said control surface in a direction opposite to the other, a pair of master cylinders one connected to one of said brake motors and to one of said control surface motors and the other connected to the other brake motor and the other control surface motor, a master cylinder piston in each master cylinder, and means for actuating said master cylinder pistons simultaneously either in opposite directions or in the same direction.

10. In an airplane control system for an airplane equipped with a right wheel and a left wheel with a brake for each wheel and with a control surface, in combination a hydraulic motor for each brake, a pair of hydraulic motors for the control surface, each of which is arranged to move said control surface in a direction opposite to the other, a pair of master cylinders one connected to one of said brake motors and to one of said control surface motors and the other connected to the other brake motor and the other control surface motor, a piston in each of said master cylinders, means for actuating said master cylinder pistons simultaneously either in opposite directions or in the same direction, an auxiliary cylinder, a piston therein, a hand lever for controlling said auxiliary piston, and a connection from said auxiliary cylinder to both of said first mentioned cylinders.

11. In a control system for an airplane; a pair of separate means for retarding the movement of the airplane when it is upon the earth; control mechanism for said retarding means comprising a lever and a control means; hydraulic force transmitting means connecting a portion of said control mechanism and said retarding means and including a motor cylinder for each retarding means, a hydraulic pressure creating device operably connected to said lever, hydraulic connections between said pressure creating device and both of said motor cylinders; means including a fluid passage for equalizing the pressures between said motor cylinders; and means for upsetting the equalization of pressure and for operating one of said retarding means with greater force than the other; said upsetting means comprising said control means, an additional pair of separate hydraulic pressure creating means both included in said hydraulic force transmitting means and each connected to one of said motor cylinders, and means for closing said fluid passage operated by the initial movement of one of said hydraulic pressure creating means.

12. A control system for an airplane; a pair of separate wheel brakes for retarding the movement of the airplane when it is upon the earth; control mechanism for said brakes comprising a lever and a control means; hydraulic force transmitting means connecting a portion of said control mechanism and said brakes and including a motor cylinder for each brake, a hydraulic pressure creating device operably connected to said lever, hydraulic connections between said pressure creating device and both of said motor cylinders; means including a fluid passage for equalizing the pressures between said motor cylinders; and means for upsetting the equalization of pressure and for operating one of said brakes with greater force than the other; said upsetting means comprising said control means, an additional pair of separate hydraulic pressure creating means both included in said hydraulic force transmitting means and each connected to one of said motor cylinders, and a valve for closing said fluid passage operated by the initial movement of one of said hydraulic pressure creating means.

13. A control system for an airplane; a pair of separate means for retarding the movement of the airplane when it is upon the earth; control mechanism for said retarding means comprising a lever and a control means; hydraulic force transmitting means connecting a portion of said control mechanism and said retarding means and including a motor cylinder for each retarding means, a hydraulic pressure creating device operably connected to said lever, hydraulic connections between said pressure creating device and both of said motor cylinders; means including a fluid passage for equalizing the pressures between said motor cylinders, and means for upsetting the equalization of pressure and for operating one of said retarding means with greater force than the other, said upsetting means comprising said control means, an additional pair of separate hydraulic pressure creating means both included in said hydraulic force transmitting means and each connected to one of said motor cylinders, and means for closing said fluid passage operated by the initial movement of one of said pair of additional hydraulic pressure creating means.

14. A control system for an airplane; a pair of separate means for retarding the movement of the airplane when it is upon the earth; control mechanism for said retarding means comprising a lever and a control means; hydraulic force transmitting means conecting a portion of said control mechanism and said retarding means and including a motor cylinder for each retarding means, a hydraulic pressure creating device operably connected to said lever, hydraulic connections between said pressure creating device and both of said motor cylinders including a fluid passage; and means for upsetting the equalization of pressure and for operating one of said retarding means with greater force than the other; said upsetting means comprising said control means, an additional pair of separate hydraulic pressure creating. means both included in said force transmitting means and each connected to one of said motor cylinders, and means for closing said fluid passage operated by the initial movement of one of said hydraulic pressure creating means.

15. A control system for an airplane; a pair of separate means for retarding the movement of the airplane when it is upon the earth; control mechanism for said retarding means comprising a lever and a control means; hydraulic force transmitting means connecting a portion of said control mechanism and said retarding means and including a motor cylinder for each retarding means, a hydraulic pressure creating device operably connected to said lever, hydraulic connections between said pressure creating device and both of said motor cylinders including a fluid passage; and means for upsetting the equalization of pressure and for operating one of said retarding means with greater force than the other; said upsetting means comprising said control means, an additional pair of separate hydraulic pressure creating means both included in said force transmitting means and each connected to one of said motor cylinders, and means for closing said fluid passage operated by the initial movement of one of said pair of additional hydraulic pressure creating means.

HENRY H. KERR, JR.